United States Patent
Brown

(10) Patent No.: US 6,966,233 B2
(45) Date of Patent: Nov. 22, 2005

(54) DUAL INTERDIGITATED CHAMBER SEAT BLADDER FOR OCCUPANT POSITION AND WEIGHT ESTIMATION

(75) Inventor: David R. Brown, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 161 days.

(21) Appl. No.: 10/679,802

(22) Filed: Oct. 6, 2003

(65) Prior Publication Data

US 2005/0072250 A1    Apr. 7, 2005

(51) Int. Cl.⁷ ............................................. G01L 1/02
(52) U.S. Cl. ............................................. 73/862.581
(58) Field of Search ................... 73/862.454, 862.581, 73/731

(56) References Cited

U.S. PATENT DOCUMENTS

| | | | |
|---|---|---|---|
| 4,059,909 A * | 11/1977 | Kron ........................... 434/59 |
| 4,619,481 A * | 10/1986 | Grudzinskas ............ 297/284.1 |
| 5,975,629 A * | 11/1999 | Lorbiecki .................... 297/200 |
| 5,987,370 A | 11/1999 | Murphy et al. ............... 701/45 |
| 6,101,436 A * | 8/2000 | Fortune et al. ............... 701/45 |
| 6,203,105 B1 * | 3/2001 | Rhodes, Jr. .............. 297/284.6 |
| 6,246,936 B1 | 6/2001 | Murphy et al. ............... 701/45 |
| 6,422,087 B1 * | 7/2002 | Potter .......................... 73/731 |
| 6,442,504 B1 | 8/2002 | Breed et al. ................. 702/173 |
| 6,490,936 B1 | 12/2002 | Fortune et al. ......... 73/862.581 |
| 6,578,871 B2 * | 6/2003 | Gray et al. .................. 280/735 |
| 6,623,080 B2 * | 9/2003 | Clapper ................. 297/452.41 |

* cited by examiner

*Primary Examiner*—Max Noori
(74) *Attorney, Agent, or Firm*—Stefan V. Chmielewski

(57) ABSTRACT

An occupant position and weight estimation apparatus includes an elastomeric seat bladder having physically isolated central and peripheral fluid-filled chambers corresponding to central and peripheral areas of the seat. The fluid pressure in the peripheral chamber is primarily activated by a child or infant seat, whereas the fluid pressure in the central chamber is primarily activated by a normally seated occupant. The chambers have extensions or fingers that are interdigitated so that shifting of a normally seated occupant from the central area of the seat to a peripheral region of the seat is easily detected based on changes in the relative fluid pressures in the central and peripheral chambers. An extension of the peripheral chamber at the middle forward portion of the seat that is not engaged by a normally seated occupant can also be used to detect an out-of-position occupant in close proximity to a frontal air bag.

4 Claims, 2 Drawing Sheets

US 6,966,233 B2

DUAL INTERDIGITATED CHAMBER SEAT BLADDER FOR OCCUPANT POSITION AND WEIGHT ESTIMATION

TECHNICAL FIELD

The present invention is directed to a fluid-filled seat bladder for vehicle occupant position and weight estimation, and more particularly to a seat bladder having interdigitated fluid chambers.

BACKGROUND OF THE INVENTION

Occupant position and weight estimation systems are useful in connection with air bags and other pyrotechnically deployed restraints for purposes of determining whether, and how forcefully, to deploy the restraints. For example, deployment of an air bag can be disabled if the occupant is positioned in close proximity to the air bag cover, or if the seated weight of the occupant is indicative of an infant seat or a small child. A well known weight estimation technique is to locate a fluid-filled bladder in or under a vehicle seat cushion, and to estimate the seated weight of the occupant based on the fluid pressure in the bladder. See for example, the U.S. Pat. Nos. 5,987,370 and 6,246,936 to Murphy et al., the U.S. Pat. Nos. 6,101,436 and 6,490,936 to Fortune et al., and in particular the U.S. Pat. No. 6,578,871 to Gray et al. which discloses the use of a seat bladder having multiple fluid-filled chambers corresponding to different areas of the seat cushion. In Gray et al., fluid pressures in the various chambers of the bladder are individually measured and summed to form a composite pressure, and the composite pressure is adjusted in a direction to favor restraint enablement when the pressure in an outboard chamber of the bladder significantly exceeds the average pressure. On the other hand, the restraints are disabled if the pressure distribution indicates that the occupant is positioned at the front of the seat cushion in close proximity to the air bag cover.

In a production vehicle, the capabilities of occupant position and weight estimation systems are typically limited due to cost considerations, and the systems are ideally designed to acquire the necessary information about the occupant while minimizing system cost. For example, a seat bladder can be used to reliably characterize an occupant with relatively low system cost, but the use of a bladder with several chambers and individual pressure sensors may be cost prohibitive in many vehicles. Accordingly, what is needed is way of maximizing the occupant information available from a low-cost position and weight estimation system.

SUMMARY OF THE INVENTION

The present invention is directed to an improved occupant position and weight estimation apparatus for a vehicle seat including an elastomeric seat bladder having separate central and peripheral fluid-filled chambers corresponding to central and peripheral areas of the seat. The fluid pressure in the peripheral chamber is primarily activated by a child or infant seat, whereas the fluid pressure in the central chamber is primarily activated by a normally seated occupant. The chambers have extensions or fingers that are interdigitated so that shifting of a normally seated occupant from the central area of the seat to a peripheral region of the seat is easily detected based on changes in the relative fluid pressures in the central and peripheral chambers. An extension of the peripheral chamber at the middle forward portion of the seat that is not engaged by a normally seated occupant can also be used to detect an out-of-position occupant in close proximity to a frontal air bag.

DESCRIPTION OF THE PREFERRED EMBODIMENT

Figure 1:
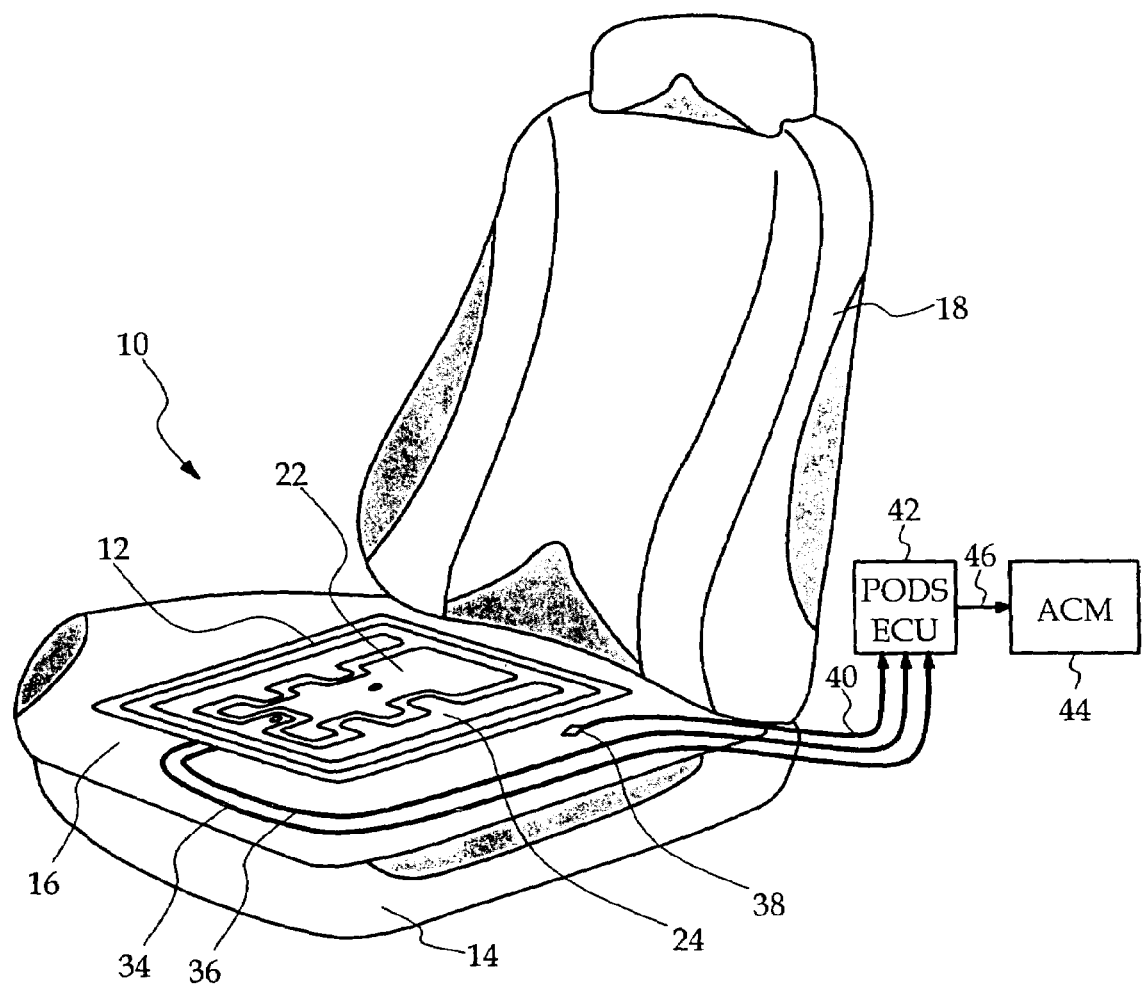
FIG. 1 is a system diagram illustrating a vehicle seat equipped with a fluid-filled bladder according to this invention, an occupant weight detection and characterization electronic control unit (PODS ECU) and an airbag control module (ACM).

Referring to FIG. 1, the reference numeral 10 generally designates a vehicle seat including a frame 14 and seat and back foam cushions 16 and 18. A fluid-filled bladder 12 is disposed in or under the seat cushion 16 substantially parallel with the seating surface, and preferably contains a fluid such as silicone which is non-corrosive, and not subject to freezing at extreme ambient temperatures. In addition, interface panels may be placed above and/or beneath the bladder 12 to protect the bladder from puncture damage and to provide a suitable reaction surface, as disclosed for example in the U.S. Pat. No. 6,490,936, assigned to the assignee of the present invention, and incorporated herein by reference.

Figure 2:
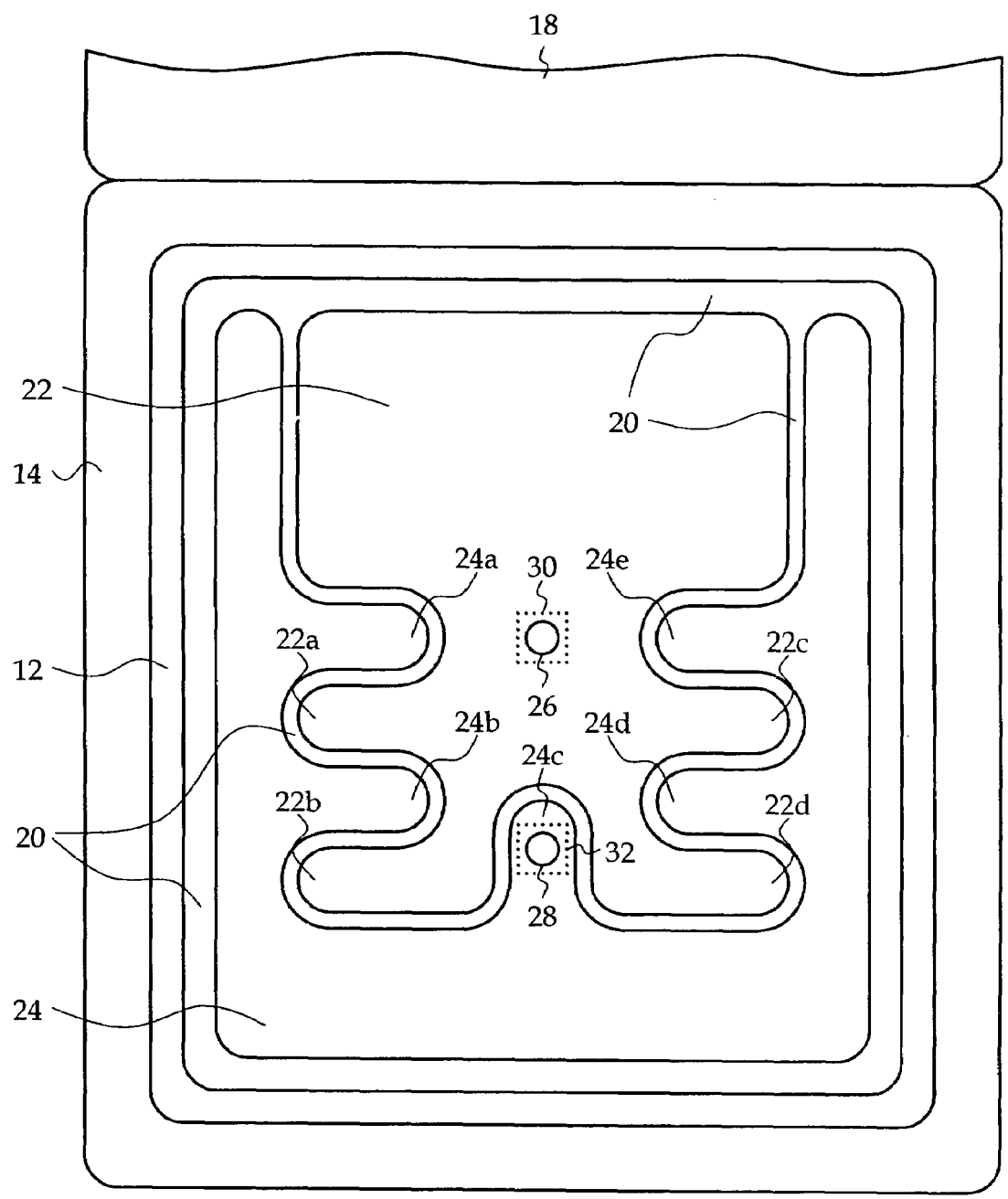
FIG. 2 is a diagram of the fluid-filled bladder of FIG. 1.

Referring to FIGS. 1 and 2, the bladder 12 is formed with two sheets of elastomeric material such as polyurethane or pellethane that are seam welded as indicated by the reference numeral 20 to form first and second individually sealed chambers 22 and 24, also referred to herein as the central and peripheral chambers because they generally correspond to central and peripheral areas of the seat cushion 16. The chambers 22 and 24 are filled with silicone via respective exit ports 26 and 28, and the exit ports 26 and 28 are coupled to respective pressure sensors 30 and 32 that produce central and peripheral pressure signals on lines 34 and 36. In generally, the fluid pressure in the peripheral chamber 24 is primarily activated by the frame of a child or infant seat secured to the seat cushion 16, whereas the fluid pressure in the central chamber 22 is primarily activated by a normally seated occupant. Significantly, the outboard portion of chamber 22 has a plurality of extensions or fingers 22a, 22b, 22c, 22d that extend laterally outward toward the peripheral chamber 24, and the forward portion of peripheral chamber 24 has a plurality of extensions or fingers 24a, 24b, 24c, 24d, 24e that extend inward toward the central chamber 22. The fingers 22a, 22b, 22c, 22d and 24a, 24b, 24c, 24d are complementary and interdigitated or interlocked as shown for purposes of detecting occupant position as discussed in further detail below.

Referring to FIG. 1, the occupant position and weight detection system preferably also includes a seat temperature sensor 38 that provides a temperature signal on line 40. The central and peripheral pressure signals on lines 34 and 36 and the temperature signal on line 40 are supplied to a passenger occupant detection system electronic control unit (PODS ECU) 42. The PODS ECU 42 characterizes the occupant of seat 10 based on the pressure and temperature signals, and provides a characterization signal to airbag control module (ACM) 44 via line 46. The ACM 44 may be conventional in nature, and operates to deploy one or more airbags or other restraint devices (not shown) for vehicle occupant protection based on measured vehicle acceleration and occupant characterization data obtained from PODS ECU 42.

The primary function of PODS ECU 42 is to estimate occupant seated weight and position based on the pressure and temperature signals provided by sensors 30, 32, 38, as described for example in the aforementioned U.S. Pat. No. 6,578,871 to Gray et al., which is incorporated herein by reference. Ultimately, PODS ECU 42 characterizes the occupant, and provides a corresponding occupant status signal to ACM 44 as mentioned above. For example, the determined status may be EMPTY in the case of a vacant seat, OCCUPIED_DISABLE in the case of an infant or child seat or a normally seated child, or OCCUPIED ENABLE in the case of an adult occupant with a seated weight that exceeds a calibrated threshold. In this regard, distinguishing between an infant or child seat and a normally seated adult is straight-forward since the central chamber 22 is primarily activated by a normally seated adult, and the peripheral chamber 24 is primarily activated by an infant or child seat. As in Gray et al., fluid pressures in the central and peripheral chambers 22 and 24 are summed to form a composite pressure reflective of the seated weight, and the composite pressure may be adjusted in a direction to favor restraint enablement when the pressure in the peripheral chamber 24 indicates that the occupant is positioned in a peripheral region of the seat cushion 16. Additionally, the interlocking configuration of the central and peripheral chambers 22 and 24 permits PODS ECU 42 to simply and reliably detect shifting of a normally seated occupant from the central area of seat cushion 16 to a peripheral region of the seat cushion 16. When such shifting occurs, there is a continuous shifting of pressure from the central chamber 22 to the peripheral chamber 24 that is easily detected by the relative values of central and peripheral pressure signals on lines 34 and 36. In a particularly advantageous implementation, PODS ECU 42 computes a difference of the two pressure signals to provide a measure of the direction and speed of occupant weight shifting, particularly when the occupant shifts laterally on the cushion 16. Additionally, the extension 24c of peripheral chamber 24 at the front-center portion of seat cushion 16 is used to identify forward shifting of the occupant. The extension 24c is disposed between the legs of a normally seated occupant, and is therefore not significantly activated. However, when the occupant weight shifts forward on the cushion 16, the extension 24c becomes fully activated producing a sharp increase in the peripheral pressure signal that only occurs with such forward shifting.

In summary, the present invention reliably provides a seat bladder for occupant weight estimation that significantly enhances occupant position detection at a low overall system cost. While described in reference to the illustrated embodiments, it should be understood that various modifications will occur to persons skilled in the art. For example, the number, shape and size of the chamber extensions may be different than shown, and so on. Thus, many variations are possible, and it will be understood that any of a number of configurations may fall within the scope of this invention, which is defined by the appended claims.

What is claimed is:

1. Apparatus including a multiple chamber elastomeric bladder disposed in a vehicle seat for occupant position and weight estimation, comprising:

first and second individual fluid-filled bladder chambers, the first chamber being disposed in a central area of said seat that is primarily used by a normally seated occupant, and the second chamber being disposed in a peripheral area of said seat that is laterally outboard and forward of said central area; and the second chamber having at least one fluid-filled finger that extends inward toward the first chamber to enhance detection of occupant shifting between the central and peripheral areas of said seat based on relative fluid pressures in said first and second chambers.

2. The apparatus of claim 1, wherein:

the second chamber has a plurality of fingers that extend inward toward the first chamber, and the first chamber has a plurality of fingers that extend outward toward said second chamber, the fingers of the first chamber being interdigitated with the fingers of the second chamber.

3. The apparatus of claim 2, wherein:

the fingers of said second chamber extend laterally inward, and the fingers of said first chamber extend laterally outward.

4. The apparatus of claim 1, wherein:

said fluid-filled finger extends rearward from a front-center portion of said seat to enhance detection of occupant shifting between the central area of said seat and a forward peripheral area of said seat based on relative fluid pressures in said first and second chambers.

* * * * *